United States Patent [19]
Godfrey

[11] Patent Number: 5,458,982
[45] Date of Patent: Oct. 17, 1995

[54] MODIFIED POLYETHYLENE BASED HOT-MELT ADHESIVES FOR USE IN PACKAGING

[75] Inventor: Darryl A. Godfrey, Charlotte, N.C.

[73] Assignee: Eastman Chemical Company, Kingsport, Tenn.

[21] Appl. No.: 344,904

[22] Filed: Nov. 25, 1994

Related U.S. Application Data

[62] Division of Ser. No. 130,544, Oct. 1, 1993, Pat. No. 5,382,615.

[51] Int. Cl.$^6$ ...................................................... B32B 27/10
[52] U.S. Cl. ............................................ 428/514; 428/522
[58] Field of Search .................................... 428/514, 522, 428/507, 511

[56] References Cited

U.S. PATENT DOCUMENTS

| | | |
|---|---|---|
| 3,856,889 | 12/1974 | McConnell . |
| 4,081,415 | 3/1978 | Matubara et al. . |
| 4,140,733 | 2/1979 | Meyer et al. . |
| 4,146,521 | 3/1979 | Godfrey ..................... 428/461 |
| 4,460,728 | 7/1984 | Schmidt et al. . |
| 4,487,885 | 12/1984 | Adur et al. . |
| 4,537,836 | 8/1985 | Adur et al. . |
| 4,752,634 | 6/1988 | Goss . |

*Primary Examiner*—Jeffrey T. Smith
*Attorney, Agent, or Firm*—Mark A. Montgomery; Harry J. Gwinnell

[57] ABSTRACT

Hot-melt adhesive compositions useful for packaging are disclosed. These hot-melt adhesive compositions are based on modified polyethylene and contain an ethylene-alkylacrylate copolymer, a polyethylene graft copolymer, a tackifying resin, and a high-melting low viscosity wax. The hot-melt adhesive compositions disclosed have fast setting times and a novel combination of desired properties with good high and low temperature bond strength.

14 Claims, No Drawings

MODIFIED POLYETHYLENE BASED HOT-MELT ADHESIVES FOR USE IN PACKAGING

This is a divisional application of application Ser. No. 08/130,544 filed Oct. 1, 1993 now U.S. Pat. No. 5,382,615.

FIELD OF THE INVENTION

The present invention relates to modified polyethylene containing hot-melt adhesives. More particularly, the present invention relates to fast setting, hot-melt adhesives with a novel combination of properties containing a modified polyethylene and an ethylene-alkylacrylate copolymer.

BACKGROUND OF THE INVENTION

Hot melt adhesives are widely used in industry for various packaging applications. Most such applications, require that the adhesive have a fast set time, good machinability, and good bond aging characteristics. In addition, it is desirable that the adhesive maintain bonds over as broad a temperature range as possible.

Most hot-melt packaging adhesives are based on polyethylene or ethylene-vinyl acetate copolymer. Polyethylene and chemically modified polyethylene based formulas tend to have excellent elevated temperature properties, while ethylene-vinyl acetate based adhesives tend to have very good low temperature properties. The choice of which of these two adhesives sometimes depends upon the needed properties of the final end use. Blending of polyethylene or chemically modified polyethylene with ethylene-vinyl acetate to obtain broader temperature properties is often not very effective because of compatibility problems. Therefore, a hot-melt adhesive for packaging applications having a good bond strength over a broad temperature has not been possible.

In light of the above, it would be very desirable to be able to produce a hot-melt adhesive for packaging applications having a fast set time and a good balance of properties while maintaining good bond strength at elevated temperatures and low temperatures.

SUMMARY OF THE INVENTION

The hot-melt adhesive composition according to the present invention comprises a blend of:
(a) about 5 to 20 weight percent of a copolymer of ethylene and alkyl acrylate or alkyl methacrylate, having an alkyl acrylate or alkyl methacrylate content of 4 to 15 mole percent and a melt index of 70 to 500;
(b) about 40 to 70 weight percent of a polyethylene graft copolymer having a saponification number of about 3 to 60 that is grafted with an unsaturated polycarboxylic acid, anhydride, or ester thereof;
(c) about 15 to 35 weight percent of a tackifying resin selected from the group consisting of aliphatic hydrocarbon resins, polyterpene resins, and rosin ester resin; and
(d) about 5 to 20 weight percent of a high melting, low viscosity wax selected from the group consisting of high density polyethylene waxes, Fischer-Tropsch synthetic waxes, and microcrystalline waxes, wherein the composition has a melt viscosity of about 300 to 4,000 cp at 350° F. (177° C.).

Detailed Description of the Invention

The applicant has unexpectedly discovered an improved hot-melt adhesive composition for packaging applications that is fast setting and has a novel combination of desirable properties. The novel hot-melt adhesive composition according to the present invention has a very short set time, moderate open time, excellent elevated temperature performance, excellent low temperature performance, good bond aging characteristics, low density, relatively low melt viscosity and good molten stability. Prior to the present invention, these properties could not be formulated together into the same hot-melt adhesive. Additionally, the low density of the adhesive facilitates its removal from corrugated board in the recycling of used boxes.

The hot-melt adhesive composition according to the present invention that is useful in packaging applications contains about 5 up to about 20 weight percent of a copolymer of ethylene and alkyl acrylate or alkyl methacrylate, having an alkyl acrylate or alkyl methacrylate content of about 4 to 15 mole percent and a melt index of about 70 to 500. This copolymer of ethylene and alkyl acrylate or alkyl methacrylate is preferably in a concentration of about 5 to 18 weight percent, more preferably about 7 to 15 weight percent, with a weight percent of about 10 to 13 being most preferred. Amounts of this ethylene copolymer much below about 5 weight percent do not exhibit as desirable a combination of set time, open time, bond aging, and low temperature performance, whereas amounts much over about 18 weight percent result in undesirable viscosity increases, shorter open time, and can result in compatibility problems.

The amount of the alkyl acrylate or alkyl methacrylate present in the copolymer of ethylene-alkyl acrylate varies from about 4 to 15 mole percent. This amount of alkyl acrylate comonomer is preferably about 5 to 13 mole percent, with a mole percent of about 8 to 10 being most preferred. Amounts of the alkylacrylate comonomer in the copolymer much below about 4 mole percent would produce a copolymer that is too crystalline in nature and would not have as good low temperature properties or bond aging characteristics whereas amounts much above 15 mole percent would produce poor compatibility with the other compounds which is undesirable since the blend components would separate in the molten state.

The ethylene alkyl acrylate copolymer used in the hot-melt adhesive composition of the present invention has a melt index of 70 to 500 as determined by ASTM test method D-1238. The melt index of the ethylene acrylate copolymer is preferably about 200 to 400, more preferably about 250 to 350 with a melt index of about 270 being most preferred. The use of an ethylene acrylate copolymer having a melt index much below 70 would produce a hot-melt adhesive that would be too high in viscosity for effective use in high speed packaging. Ethylene acrylate copolymers having a melt index much above 500 are not commercially available but would produce a hot-melt adhesive with long set times and poorer elevated temperature properties.

Examples of suitable copolymers of ethylene and alkyl acrylate or alkyl methacrylate include ethylene-ethyl acrylate, ethylene-n-butyl acrylate, and ethylene-methyl acrylate, with ethylene-methyl acrylate being most preferred. A particularly suitable example of ethylene-methyl acrylate copolymer is available from Exxon Chemical Company as OPTEMA XS93.04 having a melt index of about 270, a methyl acrylate content of about 21 weight percent and a density of about 0.94 g/cm$^3$.

The hot-melt adhesive composition according to the present invention is a modified polyethylene based composition that contains about 40 to 70 weight percent of a polyethylene graft copolymer having a saponification number of about 3 to 60 that is grafted with an unsaturated polycarboxylic acid, anhydride, or ester thereof. A preferred amount of this polyethylene graft copolymer is about 40 to 60 weight percent, more preferably about 45 to 55 weight percent, with a weight percent of about 50 to 52 being most preferred. Amounts of this modified polyethylene much below 40 weight percent produces an adhesive exhibiting shorter open time and poorer elevated temperature properties. Additionally, since the modified polyethylene is the less expensive component in the adhesive, an adhesive with lower amounts of modified polyethylene would be more expensive. Amounts of the modified polyethylene much above 70 weight percent would produce an adhesive that does not have as good bond aging, as fast set time or as long open time.

The process of producing this polyethylene graft copolymer is a process well known in the art as for example in U.S. Pat. No. 3,856,889 the disclosure of which is incorporated herein by reference in its entirety. The polyethylene reacted with this unsaturated component can be low molecular weight or degraded polyethylene. The polyethylene has been reacted to such an extent that the saponification number is about 3 to 60, preferably about 3 to 10, more preferably about 3 to 7 with a saponification number of about 5 being most preferred. A saponification number much below about 3 does not provide a significant amount of modification to the polyethylene to be useful in the blends of the present adhesive composition whereas a saponification number much above 60 is not practical because of poor molten stability, higher color, and higher odor.

The polyethylene graft copolymer used in the adhesive composition of the present invention preferably has a viscosity of about 350 to 15,000 cp at 150° C., more preferably, about 2,000 to 8,000 cp at about 150° C., with a viscosity of about 4,000 cp at 150° C. being most preferred. Polyethylene graft copolymers having a viscosity much below about 350 cp @ 150° C. produces adhesives with lower cohesive strength whereas polyethylene graft copolymers having a viscosity much above 15,000 cp @ 150° C. produces adhesives with viscosities that are higher than desirable for packaging applications.

The polyethylene graft copolymer used in the adhesive composition of the present invention preferably has a melt index of about 100 to 5,000 at 190° C., more preferably, about 1,000 to 5,000 at 190° C., with a melt index of about 2,000 to 4,000 at 190° C. being most preferred. A polyethylene graft copolymer with a melt index much below about 100 is not very practical since the viscosity of the resulting adhesives is higher than desirable for packaging applications, whereas a melt index much above 5,000 at 190° C. is impossible to accurately measure.

Examples of suitable unsaturated polycarboxylic acid, anhydride or esters thereof that can be reacted with polyethylene are disclosed in U.S. Pat. No. 3,856,889.

The ethylene graft copolymer of the adhesive composition of the present invention preferably has a density of about 0.89 to 0.93, more preferably about 0.905 g/cm$^3$. The polyethylene composition of the present invention preferably has a ring and ball softening point of about 85° to 120° C. with a ring and ball softening point of about 102° C. being most preferred.

The amount of tackifying resin used in the hot-melt adhesive composition of the invention is about 15 to 35 weight percent, preferably about 20 to 30 weight percent with a weight percent of about 20 to 25 being most preferred. Amounts of tackifying resin much below about 15 weight percent do not produce a hot-melt adhesive that has good bond characteristics after application, whereas amounts much above 35 weight percent produce a hot-melt adhesive that has poor bond aging and poor low temperature properties.

The tackifying resin used in the hot-melt adhesive composition according to present invention is selected from the group consisting of aliphatic hydrocarbon resins, polyterpene resins, and rosin ester resins. Suitable hydrocarbon resins include DAC-B hydrocarbon resin prepared according to process disclosed in U.S. Pat. No. 4,146,521 as well as other hydrocarbon resins, synthetic polyterpenes, rosin esters and the like. One such suitable hydrocarbon tackifying resin is a hydrocarbon resin having a softening point of 130° C. and available commercially as Eastman Resin H-130® from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These hydrocarbon tackifying resins typically exhibit a ring and ball softening point of from about 75° to 150° C.; an acid number of from about 0 to 2; a saponification value of less than about 1; and an iodine value of from about 75–100. Examples of such commercially available resins of this type are "Wingtack 95" as sold by the Goodyear Tire and Rubber Co. and the Sta-Tac and Betaprene H resins sold by the Reichhold Chemical Corp.

Also suitable resins are the rosin ester resins and the terpene polymers such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, terpentine, a terpene cut or fraction, and various other terpenes. Particularly useful starting materials are terpene mixtures containing at least 20% β-pinene and/or limonene or dipentene (racemic limonene), and the "sulfate turpentine" obtained as a by-product in the sulfate pulping process.

Preferred tackifying resins used in the hot-melt adhesive composition of the present invention have a ring and ball softening point of at least 85° C., preferably about 90° to 140° C., with a ring and ball softening point of about 130° C. being most preferred.

The composition according to the present invention contains about 5 to 20 weight percent of a high melting, low viscosity wax selected from the group consisting of high density polyethylene waxes, Fischer-Tropsch synthetic waxes, and microcrystalline waxes. The amount of this wax in the hot-melt adhesive composition of the present invention is preferably about 8 to 18 weight percent, with a weight percent of about 10 to 15 being most preferred. Amounts of wax much below about 5 weight percent are not sufficient to impart short set time in the adhesive, whereas amounts much above about 20 weight percent adversely affect adhesion and bond aging.

This high melting wax used in the hot-melt adhesive composition of the present invention preferably has a ring and ball softening point of at least 80° C. with a ring and ball softening point of about 90° to 120° C. being most preferred. A wax having a ring and ball softening point below about 80° C. does not impart sufficient high temperature properties and makes an adhesive set too slowly.

The wax used in the hot-melt adhesive composition of the present invention is a low viscosity wax and preferably has the viscosity of about 4 to 500 cp at 150° C., more preferably about 25 to 400cp at 150° C. with a viscosity of about 350 cp at 150° C. being most preferred. A wax having a viscosity much above 500 cp @ 150° C. yields adhesives too high in viscosity.

The high density polyethylene wax is the more preferred wax and it preferably has a density between 0.93 and 0.97 g/cm$^3$, more preferably about 0.94 to 0.96 cm$^3$ with a density of about 0.95 g/cm$^3$ being most preferred. Wax having densities much below 0.93 are less desirable because they produce slower setting adhesives whereas densities much above 0.97 are not practical. A suitable example of high density polyethylene wax is Epolene N-21, available from Eastman Chemical Company.

The hot-melt adhesive composition of the present invention has a melt viscosity of about 300 to below 4,000 cp at 350° F. (177° C.). The hot-melt adhesive composition of the present invention, in order to be more useful in packaging applications, preferably has a melt viscosity no higher than 3,000 cp at 350° F., more preferably no higher than about 2,000 cp at 350° F., with a viscosity less than 1,500 cp at 350° C. being most preferred. At higher viscosities such as those near 4,000 cp, a hot-melt adhesive would exhibit stringing and other poor machining characteristics on high speed lines. Melt viscosities much below about 300° at 350° F. are not practical in that cohesive strength of the blend would be poor. Should the melt viscosity of the adhesive be measured at a higher temperature, such as 375° F., the viscosity would be significantly reduced at that temperature.

The adhesive compositions of this invention are prepared by blending together the adhesive components in the melt at a temperature of about 160° C. to about 200° C. until a homogeneous mixture is obtained. Various methods of blending materials of this type are known to the art and any method that produces homogeneous mixture is satisfactory. These components blend easily in the melt and a heated vessel equipped with a stirrer is all that is required. For example, a Cowles stirrer provides effective mixing for preparing these compositions. Solvents such as hexane, heptane, mineral spirits, xylene, toluene, benzene, chlorinated hydrocarbons, etc., are not needed to prepare the compositions of this invention; however, they can be used if desired.

In addition to the adhesive components, it is desirable for the adhesive compositions to contain about 0.1 per cent to about 1.5 percent by weight, preferably about 0.25 percent to 1.0 percent by weight, of one or more antioxidants. Antioxidants that are effective include, for example, tris(di-t-butyl-p-hydroxybenzyl)-trimethyl-benzene(Ionox 330), alkylated bisphenol (Naugawhite), zinc dibutyl dithiocarbamate (Butyl Zimate), and 4,4'-methylene bix (2,6-di-tert-butylphenol) (Ethyl 702), tetrakis[methylene-3-(3',5'-di-t-butyl- 4-hydroxyphenyl)-propionate]-methane (Irganox 1010), lauryl stearyl thiodipropionate (Plastanox 1212), and dilauryl 3,3'-thiodipropionate (Plastanox DLTDP sold by American Cyanamid) and 2,6-di-tert-butyl-p-cresol (BHT) and the like.

The hot-melt adhesive composition according to the present invention is generally applied to a substrate in packaging applications by being extruded onto the surface of substrate, while in the melt phase, and then contacted with another surface which is a second substrate or second surface of the same substrate, such as a box flap. Suitable substrates include but are not limited to, paper, corrugated board, and chip board with corrugated board and chip board being most preferred.

The following examples are intended to illustrate the present invention but should not be interpreted as a limitation thereof.

EXAMPLES

Examples 1–17

Examples 1-17 are illustrated in Table 1 and contain a mixture of antioxidants Irganox 1010 (from Ciba-Geigy) and Cyanox 1212 (from American Cyanamid) along with the specified amounts of the components: 1. an ethylene-methylacrylate copolymer, 2. a polyethylene graft copolymer, 3. a tackifying resin, and 4. a high-melting low viscosity wax, as further defined below.

1. Epolene C-18, a chemically modified polyethylene having a saponification number of about 5, a viscosity of about 4,000 cp. @ 150° C., a density of about 0,905 g/cm$^3$, and a ring and ball softening point of about 102° C.

2. Exxon OPTEMA XS 93.04, an ethylene-methyl acrylate copolymer of about 270 melt index, about 21% methyl acrylate content by weight (about 8 mole %), and a density of about 0.94 g/cm$^3$.

3. Epolene N-21, a wax having a viscosity of about 350 cp. @ 150° C., a density of about 0.95 g/cm$^3$, and a ring and ball softening point of about 120° C.

4. Eastotac H-130R, an essentially aliphatic hydrocarbon tackifying resin having a viscosity of about 1,200 cp. @ 190° C., a density of about 1.04 g/cm$^3$, and a ring and ball softening point of about 130° C.

The blends were prepared by mixing the solid weighed components, melting them in containers placed in heating mantles, and stirring the blends for one hour at 200° C. under nitrogen purge. The various amounts and properties are illustrated in Table 1.

TABLE 1

| Example | 1 | 2 | 3 | 4 | 5 | 6 | 7 | 8 | 9 |
|---|---|---|---|---|---|---|---|---|---|
| Epolene C-18 | 40.00 | 70.00 | 60.00 | 60.00 | 50.00 | 60.00 | 50.00 | 50.00 | 50.00 |
| Exxon 93.04 EMA | 15.00 | 5.00 | 5.00 | 5.00 | 5.00 | 15.00 | 15.00 | 15.00 | 10.00 |
| Eastotac H-130R | 30.00 | 20.00 | 20.00 | 30.00 | 30.00 | 20.00 | 20.00 | 30.00 | 25.00 |
| Epolene N-21 | 15.00 | 5.00 | 15.00 | 5.00 | 15.00 | 5.00 | 15.00 | 5.00 | 15.00 |
| Irganox 1010 | 0.20 | 0.20 | 0.20 | 0.20 | 0.20 | 0.20 | 0.20 | 0.20 | 0.20 |
| Cyanox 1212 | 0.70 | 0.70 | 0.70 | 0.70 | 0.70 | 0.70 | 0.70 | 0.70 | 0.70 |
| Viscosity @ 350° F., cps | 1218 | 1315 | 1058 | 1095 | 853 | 1790 | 1428 | 1545 | 1103 |
| Softening Point, °C. | 112.6 | 104.9 | 112.6 | 105.2 | 112.4 | 106.3 | 113.3 | 106.3 | 112.4 |
| R. T. Peel, g kraft | 560 | 1003 | 903 | 963 | 886 | 925 | 737 | 1044 | 871 |
| Waldorf Set Time, sec. | 2.1 | 4.7 | 4.5 | 5.2 | 2.3 | 6.9 | 3.5 | 4.8 | 3.2 |
| Waldorf Open Time, sec. | 4.5 | 3.4 | 5.4 | 19.5 | 7.8 | 11.7 | 4.7 | 17.8 | 9.2 |
| Min. Fiber Tear Temp., °F. | −8 | <−36 | <−36 | 1 | 25 | <−42 | <−42 | 0 | <−33 |

| Example | 10 | 11 | 12 | 13 | 14 | 15 | 16 | 17 |
|---|---|---|---|---|---|---|---|---|
| Epolene C-18 | 60.00 | 50.00 | 60.00 | 50.00 | 60.00 | 60.00 | 50.00 | 55.00 |
| Exxon 93.04 EMA | 10.00 | 10.00 | 10.00 | 15.00 | 5.00 | 8.33 | 11.67 | 10.00 |
| Eastotac H-130R | 25.00 | 30.00 | 20.00 | 25.00 | 25.00 | 23.33 | 26.67 | 25.00 |
| Epolene N-21 | 5.00 | 10.00 | 10.00 | 10.00 | 10.00 | 8.33 | 11.67 | 10.00 |
| Irganox 1010 | 0.20 | 0.20 | 0.20 | 0.20 | 0.20 | 0.20 | 0.20 | 0.20 |
| Cyanox 1212 | 0.70 | 0.70 | 0.70 | 0.70 | 0.70 | 0.70 | 0.70 | 0.70 |
| Viscosity @ 350° F., cps | 1395 | 1125 | 1363 | 1488 | 1070 | 1248 | 1223 | 1238 |
| Softening Point, °C. | 106.3 | 110.2 | 111.2 | 111.7 | 110.3 | 110.1 | 112.3 | 110.8 |
| R. T. Peel, g kraft | 861 | 974 | 883 | 983 | 929 | 926 | 901 | 945 |
| Waldorf Set Time, sec. | 5.1 | 3.9 | 4.1 | 3.8 | 3.6 | 4.6 | 4.3 | 4.4 |
| Waldorf Open Time, sec. | 10.4 | 15.4 | 9.7 | 8.5 | 9.3 | 6.1 | 10.0 | 7.5 |
| Min. Fiber Tear Temp., °F. | <−33 | −13 | <−42 | <−36 | −6 | <−33 | −13 | 0 |

Examples 18–25

Examples 18–25 are illustrated below in Table 2 and Examples 18–21 were prepared essentially as above except that Examples 18–21 were prepared with amounts of components that were predicted from Examples 1–17 to obtain desired combinations of set time, open time, viscosity, and minimum fiber tear temperature. Examples 22 and 23 were prepared with an unmodified polyethylene instead of a modified polyethylene.

TABLE 2

| Example | 18 | 19 | 20 | 21 | 22 | 23 | 24 | 25 |
|---|---|---|---|---|---|---|---|---|
| Epolene C-15 | — | 52.0 | — | — | 52.0 | 50.0 | | |
| Epolene C-18 | 46.8 | — | 50.0 | 50.0 | — | — | | |
| Exxon XS93.04-EMA | 8.3 | 13.0 | 10.0 | 7.0 | 13.0 | 10.0 | | |
| Eastotac H-130R | 30.0 | 20.0 | 25.0 | 28.0 | 20.0 | 25.0 | | |
| Epolene N-21 | 14.9 | 15.0 | 15.0 | 15.0 | 15.0 | 15.0 | | |
| Irganox 1010 | 0.2 | 0.2 | 0.2 | 0.2 | 0.2 | 0.2 | | |
| Cyanox 1212 | 0.7 | 0.7 | 0.7 | 0.7 | 0.7 | 0.7 | | |
| Viscosity @ 350 F., cps | 945 | 1328 | 1090 | 943 | 1355 | 1115 | 1100 | 900 |
| Softening Point, C. | 113.0 | 113.2 | 113.5 | 112.2 | 113.7 | 112.7 | 110.0 | 109.0 |
| IOPP Cleavage Temp, F.* | 160 | 180 | 180 | 185 | 140 | 145 | 155 | 165 |
| R. T. Peel, g kraft | 933 | 905 | 978 | 876 | 721 | 786 | 900 | 900 |
| Waldorf Set Time, sec. | 2.7 | 3.6 | 2.9 | 3.0 | 3.6 | 3.3 | 5.0 | 3.5 |
| Waldorf Open Time, sec. | 8.5 | 8.4 | 9.2 | 9.7 | 3.8 | 3.0 | 4.0 | 15.0 |
| Min. Fiber Tear Temp., F. | 25 | <−31 | −8 | 14 | 5 | 9 | −6 | 30 |
| Density, g/cc | 0.953 | 0.942 | 0.948 | 0.950 | 0.942 | 0.948 | 0.94 | 0.95 |
| Molten Stability @ 350 F. after 100 hrs. % Viscosity Change | 14 | 2 | 10 | 20 | −18 | −10 | 20 | 20 |
| Bond Aging @ 120 F. on Recycled Corrugated Board | | | | | | | | |
| Initial | P+ P+ P | F F F | F F F | P+ P+ F | P+ F F | F P+ P | F F F | F F F |
| 2 weeks | F F F | F F F | F F F | F F F | P+ P S | N N N | F F F | F F F |
| 4 weeks | P+ P+ P | F F F | P+ P+ P | P P S | N N N | N N N | F F F | F F F |
| Corrugated Board | | | | | | | | |
| Initial | F F F | F F F | F F F | F F F | F F F | F F F | F F F | F F F |
| 2 weeks | F F F | F F F | F F F | F F F | F F F | P+ F F | F F F | F F F |
| 4 weeks | F F F | F F F | F F F | F F F | F F F | P P S | F F F | F F F |
| White/white chipboard | | | | | | | | |
| Initial | F F F | F F F | F F F | F F F | F F F | F F F | F P+ P | P+ P+ F |
| 2 weeks | F F F | F F F | F F F | F F F | F F F | F F F | F F F | P+ P+ F |
| 4 weeks | F F F | F F F | F F F | F F F | F F F | F F F | F F F | F F F |
| White/brown chipboard | | | | | | | | |
| Initial | F F F | F F F | F F F | F F F | F F F | F F F | F F F | F F F |
| 2 weeks | F F F | F F F | F F F | F F F | P+ P+ S | F N N | F F F | F F F |
| 4 weeks | F F F | F F F | F F F | F F F | P+ P+ F | P N N | F F F | F F F |

F = Full fiber tear (100% of bonded surface)
P+ = Partial Fiber Tear Plus (75–99% of bonded surface)
P = Partial Fiber Tear (25–74% of bonded surface)
S = Slight Fiber Tear (<25% of bonded surface)
N = No fiber Tear
*Ability of a 25 mg/cm bead on corrugated kraftboard to support 60 g/cm cleavage stress for 24 hours.

Properties of Examples 18–21 were very good; however, the properties of Examples 19 and 20 are the most desirable for packaging adhesives. These adhesives provide very short set time, moderate open time, excellent elevated temperature performance (IOPP cleavage temperature), excellent low temperature performance (minimum fiber tear temperature), good bond aging characteristics, low density, relatively low viscosity and good molten stability. Typical fast setting and low temperature polyethylene packaging formula properties are shown in Table 2 for comparison as Examples 24 and 25. These are commercial adhesives identified as Eastobond A-383 and Eastobond A-765 respectively available from Eastman Adhesives a division of Eastman Chemical Company. Examples 19 and 20 are superior to the typical low temperature packaging formula in elevated temperature performance, set time, and open time. They are superior to the typical fast setting formula in elevated temperature performance and low temperature performance.

Examples 22 and 23 are similar to Examples 19 and 20 but include an unmodified polyethylene instead of the modified polyethylene used in the prior examples. As shown in Table 2, elevated temperature properties, open time, and bond aging of Examples 22 and 23 are inferior to those of Examples 18 and 21 and the low temperature properties of Examples 22 and 23 were nowhere near as good as Examples 19 and 20.

Examples 26–33

Examples 26–29, shown below in Table 3 include formulations similar to Example 19 except that other waxes have been substituted. Similarly Examples 30–33, shown below in Table 3, are similar in composition to Example 20, but different waxes have been used in place of Epolene N-21. While these examples each have some desirable properties, none has as good a combination of properties as does the corresponding blend containing Epolene N-21. Paraflint H-4 is a Fischer-Tropsch wax from Moore and Munger, as is Paraflint C-80. Polylets 300B is a high density polyethylene from Chusei. Petrolite C4040 is a high density polyethylene from Petrolite.

copolymer of 62 melt index produces adhesives too high in viscosity to be very useful in high speed packaging.

TABLE 3

| Example | 26 | 27 | 28 | 29 | 30 | 31 | 32 | 33 |
|---|---|---|---|---|---|---|---|---|
| Epolene C-18 | 51.1 | 51.1 | 51.1 | 51.1 | 49.1 | 49.1 | 49.1 | 49.1 |
| Exxon X593.04 | 13.0 | 13.0 | 13.0 | 13.0 | 10.0 | 10.0 | 10.0 | 10.0 |
| Eastotac H-130R | 20.0 | 20.0 | 20.0 | 20.0 | 25.0 | 25.0 | 25.0 | 25.0 |
| Paraflint H-4 | 15.0 | — | — | — | 15.0 | — | — | — |
| Paraflint C-80 | — | 15.0 | — | — | — | 15.0 | — | — |
| Polylets 300B | — | — | 15.0 | — | — | — | 15.0 | — |
| Petrolite C4040 | — | — | — | 15.0 | — | — | — | 15.0 |
| Irganox 1010 | 0.2 | 0.2 | 0.2 | 0.2 | 0.2 | 0.2 | 0.2 | 0.2 |
| Cyanox 1212 | 0.7 | 0.7 | 0.7 | 0.7 | 0.7 | 0.7 | 0.7 | 0.7 |
| Viscosity @ 350° F., cps | 953 | 888 | 1023 | 970 | 755 | 696 | 813 | 765 |
| Softening Point °C. | 101.8 | 95.9 | 104.3 | 101.7 | 102.1 | 94.9 | 103.5 | 101.5 |
| IOPP Cleavage Temp., F.° | 170 | 155 | 170 | 185 | 185 | 165 | 175 | 185 |
| Waldorf Set Time, sec | 3.6 | 6.7 | 6.0 | 3.4 | 2.9 | 4.2 | 4.3 | 3.0 |
| Waldorf Open Time, sec | 2.4 | 2.8 | 5.0 | 4.1 | 4.9 | 4.1 | 3.2 | 6.4 |
| Min. Fiber Tear Temp., °F. | <−27 | <−31 | <−38 | <−38 | −6 | −2 | 27 | 27 |
| Density, g/cc | 0.934 | 0.938 | 0.943 | 0.938 | 0.945 | 0.945 | 0.944 | 0.947 |
| Molten Stability @ 350 F. after 100 Hrs. % Viscosity Change | −16 | −13 | −15 | −17 | −9 | −11 | −4 | −13 |
| Bond Aging at 120 F. on Recycled Corrugated Board | | | | | | | | |
| Initial | F F F | F F P | F P F | F F F | S S N | P F F | F F P | F F F |
| 2 Weeks | F F F | F F P | F F F | F F F | S N N | S S S | F F F | F F P |
| 4 Weeks | F F F | F F F | F F F | F F F | N N N | N S N | F F F | S S P |

F = Full fiber tear (100% of bonded surface)
P+ = Partial Fiber Tear Plus (75–99% of bonded surface)
P = Partial Fiber Tear (25–74% of bonded surface)
S = Slight Fiber Tear (<25% of bonded surface)
N = No Fiber Tear
*Ability of a 25/mg cm bead on corrugated kraftboard to support 60 g/cm cleavage stress for 24 hours.

Examples 34–39

Examples 34–36 in Table 4 include compositions similar to Example 19 except that ethylene-methyl acrylate (EMA) copolymers of different melt indexes have been substituted for the Exxon OPTEMA XS93.04. Examples 37–39 show blends similar to Example 20 except that EMA copolymers of different melt indexes have been used. Using an EMA

TABLE 4

| Example | 34 | 35 | 36 | 37 | 38 | 39 |
|---|---|---|---|---|---|---|
| Epolene C-18 | 51.1 | 51.1 | 53.1 | 49.1 | 49.1 | 49.1 |
| Chevron 1717-70 (200 MI) | — | 13.0 | — | — | 10.0 | — |
| Chevron 1278-70 (62 MI) | 13.0 | — | — | 10.0 | — | — |
| Chevron 1718-80 (400 MI) | — | — | 13.0 | — | — | 10.0 |
| Eastotac H-130R | 20.0 | 20.0 | 20.0 | 25.0 | 25.0 | 25.0 |
| Epolene N-21 | 15.0 | 15.0 | 15.0 | 15.0 | 15.0 | 15.0 |
| Irganox 1010 | 0.2 | 0.2 | 0.2 | 0.2 | 0.2 | 0.2 |
| Cyanox 1212 | 0.7 | 0.7 | 0.7 | 0.7 | 0.7 | 0.7 |
| Viscosity @ 350 F., cps | 4075 | 1553 | 1363 | 2730 | 1258 | 1135 |
| Softening Point, C. | 114.3 | 113.9 | 113.6 | 113.5 | 113.0 | 113.1 |
| IOPP Cleavage Temp, F. | 175 | 190 | 175 | 180 | 175 | 170 |
| Waldorf Set Time, sec | 3.1 | 3.8 | 3.1 | 2.1 | 2.6 | 2.4 |
| Waldorf Open Time, sec | 3.4 | 6.0 | 3.5 | 3.1 | 6.7 | 3.6 |
| Min. Fiber Tear Temp., F. | <−29 | <−29 | <−29 | −24 | −13 | −13 |
| Molten Stability @ 350 F. After 100 Hrs. % Viscosity Change | 8 | 3 | −2 | 10 | 10 | 7 |
| Bond Aging @ 120 F. on Recycled Corrugated Board | | | | | | |
| Initial | F F F | F F P | F F F | P F F | F F P | F F F |
| 2 Weeks | F F F | F F F | F P P | F F P | F F F | F F F |
| 4 Weeks | F F F | F F P | F F F | P P N | N P P | F S F |

TABLE 4-continued

| Example | 34 | 35 | 36 | 37 | 38 | 39 |
| --- | --- | --- | --- | --- | --- | --- |

F = Full fiber tear (100% of bonded surface)
P+ = Partial Fiber Tear Plus (75–99% of bonded surface)
P = Partial Fiber Tear (25–74% of bonded surface)
S = Slight Fiber Tear (<25% of bonded surface)
N = No Fiber Tear The invention has been described in detail with particular reference to certain preferred embodiments thereof, but it will be understood that variations and modifications can be effected within the spirit and scope of the invention.

I claim:

1. An article of manufacture comprising a hot melt adhesive between two substrates, said hot melt adhesive comprising a blend of:
   (a) about 5 to 20 weight percent of a copolymer of ethylene and alkyl acrylate or alkyl methacrylate, having an alkyl acrylate or alkyl methacrylate content of 4 to 15 mole percent and a melt index of 70 to 500;
   (b) about 40 to 70 weight percent of a polyethylene graft copolymer having a saponification number of about 3 to 60 that is grafted with an unsaturated polycarboxylic acid, anhydride, or ester thereof;
   (c) about 15 to 35 weight percent of a tackifying resin selected from the group consisting of aliphatic hydrocarbon resins, polyterpene resins, and rosin ester resin; and
   (d) about 5 to 20 weight percent of a high melting, low viscosity wax selected from the group consisting of high density polyethylene waxes, Fischer-Tropsch synthetic waxes, and microcrystalline waxes,
wherein the composition has a melt viscosity of about 300 to 4,000 cP at 350° F. (177° C.).

2. The article of manufacture according to claim 1 wherein said two substrates are two pieces of the same type of substrate selected from the group consisting of paper, chipboard and corrugated board.

3. The article of manufacture according to claim 1 wherein the amounts of the components of the blend are about 5 to 18 weight percent (a), about 40 to 60 weight percent (b), about 20 to 30 weight percent (c), and about 8 to 18 weight percent (d).

4. The article of manufacture according to claim 1 wherein the amounts of the components of the blend are about 10 to 13 weight percent (a), about 45 to 55 weight percent (b), about 20 to 25 weight percent (c), and about 10 to 15 weight percent (d).

5. The article of manufacture according to claim 1 wherein said copolymer of (a) is an ethylene-methylacrylate copolymer.

6. The article of manufacture according to claim 1 wherein said polyethylene graft copolymer of (b) has a saponification number of about 3 to 10.

7. The article of manufacture according to claim 1 wherein said polyethylene graft copolymer of (b) has a viscosity of about 350 to 15,000 cP at 150° C.

8. The article of manufacture according to claim 1 wherein said polyethylene graft copolymer of (b) has a melt index of about 100 to 5,000 at 190° C.

9. The article of manufacture according to claim 1 wherein said tackifying resin of (c) has a ring and ball softening point of about 90° to 140° C.

10. The article of manufacture according to claim 1 wherein said tackifying resin of (c) is an aliphatic hydrocarbon resin.

11. The article of manufacture according to claim 1 wherein said wax of (d) has a ring and ball softening point of at least 80° C.

12. The article of manufacture according to claim 1 wherein the wax of (d) is a high-density polyethylene wax.

13. The article of manufacture according to claim 12 wherein said high-density polyethylene wax has a density of at least 0.94 g/cm$^3$.

14. The article of manufacture according to claim 1 wherein said hot melt adhesive has a melt viscosity no higher than 3,000 cP at 350° F. (177° C.).

* * * * *